(12) United States Patent
Maeda

(10) Patent No.: US 6,704,896 B1
(45) Date of Patent: Mar. 9, 2004

(54) METHOD OF AND DEVICE FOR GETTING INTERNAL BUS INFORMATION

(75) Inventor: Shohei Maeda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/553,448

(22) Filed: Apr. 19, 2000

(30) Foreign Application Priority Data

Nov. 8, 1999 (JP) ............................................. 11-317213

(51) Int. Cl.$^7$ ............................................. G01R 31/28
(52) U.S. Cl. ......................... 714/733; 714/30; 710/100
(58) Field of Search ........................... 714/733, 30, 31, 714/712, 2, 734, 724, 717, 34, 38, 25; 712/40, 227, 36, 32, 725, 200, 37; 713/600, 400, 502, 601; 710/1, 58, 100, 107, 26–29, 264–265, 48; 711/103, 219; 717/120–132, 134; 369/53, 12

(56) References Cited

U.S. PATENT DOCUMENTS 4,542,453 A * 9/1985 Patrick et al. ................. 714/8
5,371,742 A * 12/1994 Brown et al. ................... 714/2
5,923,676 A * 7/1999 Sunter et al. ................ 714/733

FOREIGN PATENT DOCUMENTS

JP 5-35528 2/1993

* cited by examiner

Primary Examiner—Guy J. Lamarre
(74) Attorney, Agent, or Firm—Burns, Doane, Swecker & Mathis, LLP

(57) ABSTRACT

An internal bus information getting method can get information output onto an internal bus to facilitate detection of a malfunction position in a storage element stored in a microcomputer during execution of a user program. The method includes first, setting a target address specifying a memory access that is expected to cause the built-in storage element to malfunction to a register, by executing an interruption handling program. Next, information output onto the internal bus is latched and held in response to a match between an address output onto the internal bus and the target address set to the register. The latched and held information is then read.

5 Claims, 4 Drawing Sheets

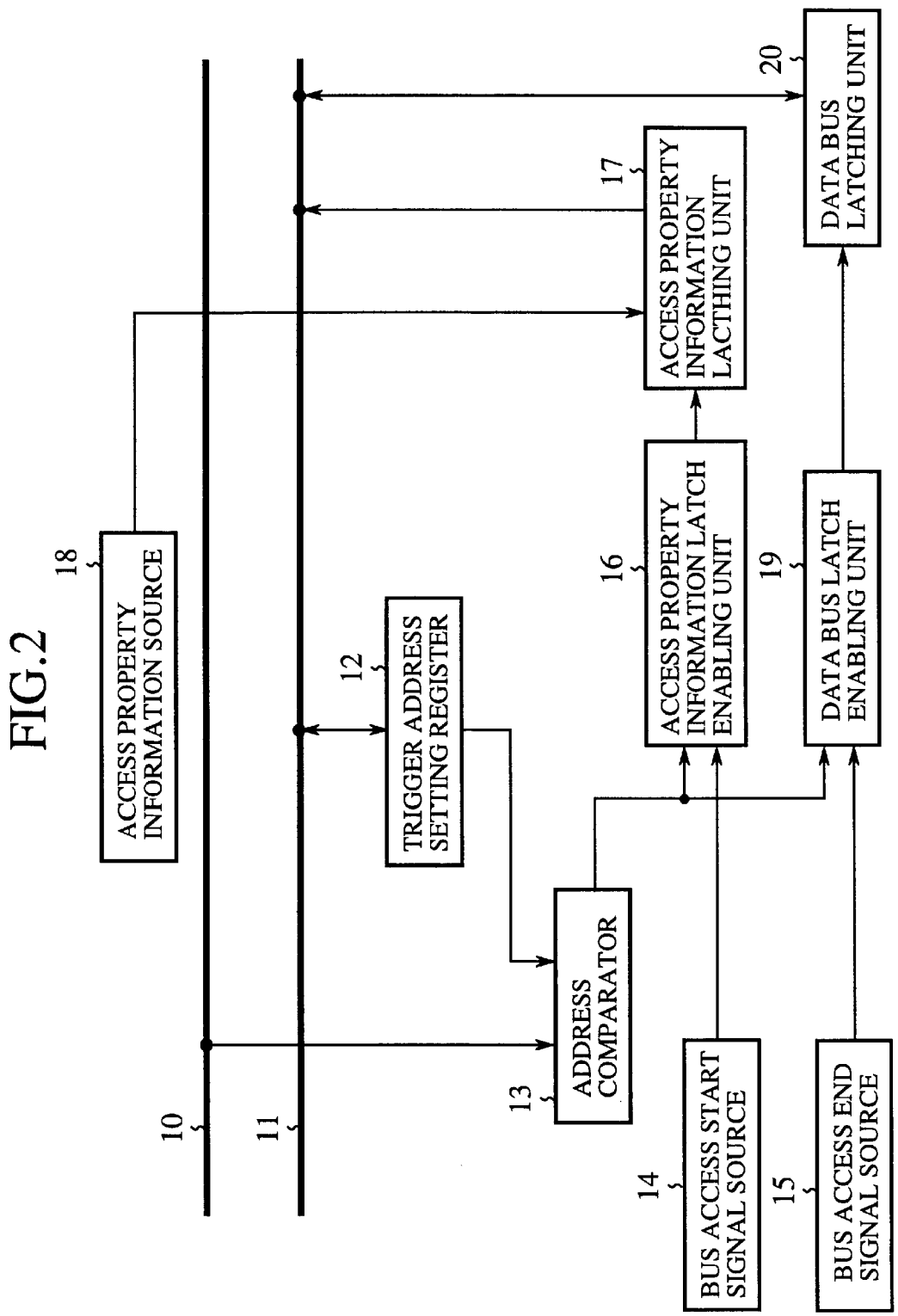

METHOD OF AND DEVICE FOR GETTING INTERNAL BUS INFORMATION

BACKGROUND OF THE INVENTION

1. Field of the Invention

The present invention relates to a method of and a device for getting information output on an internal bus in order to facilitate the detection of a malfunction position in a memory or the like stored in a microcomputer.

2. Description of the Prior Art

Recently, because of the increasing size of programs, processes growing in sophistication, and so on, improvements in performance are required of microcomputers. Speeding up the clock is effective for improvements in performance and is actually used as a means for improving the performance of microcomputers. In general, speeding up the clock is done for the CPU, first. This results in reducing "the minimum instruction execution time", which is used as an indicator showing the performance of microcomputers.

Next to speeding up the clock for the CPU, improvements in the speed of memories stored in microcomputers are done in order to improve the performance of microcomputers. Microcomputers include types with or without stored memories. The type of microcomputer without a stored memory that receives instructions directly from outside is not adapted to facilitate memory speedup. The type of microcomputer with a memory stored therein that supplies instructions read out of the memory to the CPU is adapted to increase the memory speed and hence improve the performance of the microcomputer. The present invention is associated with a microcomputer with a memory stored therein. The term "memory" designates a memory stored in the microcomputer. A mask ROM, EPROM, EEPROM, or a SRAM is frequently used as a memory stored in the microcomputer. Increases in memory speed are required due to the need for speeding up a means for supplying instructions to the CPU, which arises as the CPU speed is increased. Even when the CPU can operate at a high clock speed, the CPU may idle if the speed of the memory used for supplying instructions to the CPU is low as compared with the CPU speed.

In general, speeding up the memory is more difficult than speeding up the logic of the CPU or the like. As the amount of memory is increased, the degree of difficulty in speeding up the memory is increased. In other words, there is a trade-off between speeding up the memory and increasing the amount of memory. This results in difficulty in designing the memory. In most cases, there is no margin in the timing design of the memory. Furthermore, in order to make the memory satisfy design specifications, transistors with a very large current driving capability are frequently used to constitute the memory. As a result, the power consumption is increased and the risk of malfunctions due to noise is increased.

As previously mentioned, the memory is a component that must be designed to strict specifications during the design of the whole microcomputer, and has the highest risk of not operating as designed when tested after the chip is manufactured. When the memory does not operate as designed, the need for detection of a malfunction position in the memory arises. In order to detect a malfunction position in the built-in memory, there is a need to monitor input/output signals to or from the built-in memory in order to determine if each input/output signal has a desired value.

Because data transfer between the memory and the CPU is carried out by way of an internal bus stored in the microcomputer, the data transfer between the memory and the CPU cannot be monitored directly from outside the chip. A problem with the prior art is therefore the costs in time and effort associated with identifying that part of a user program in which the memory malfunctions.

While it is possible to facilitate an analysis of the built-in memory using a tool such as an in-circuit emulator or ICE, much time and effort are needed and a high degree of reliability cannot be ensured because such a tool uses an indirect method of estimating data to be output by the built-in memory from resultant outputs by the execution of the user program.

SUMMARY OF THE INVENTION

The present invention is proposed to solve the above problems. It is therefore an object of the present invention to provide a method of and a device for getting information output on an internal bus in order to facilitate reliable and speedy detection of a malfunction position in a built-in storage element, such as a memory stored in a microcomputer, while reducing expenses in time and effort for the analysis of the storage element stored in the microcomputer.

In accordance with one aspect of the present invention, there is provided a method of getting information output onto an internal bus to facilitate detection of a malfunction position in a storage element stored in a microcomputer during execution of a user program, the method comprising the steps of: setting a target address specifying a memory access that is expected to cause the built-in storage element to malfunction to a register, by executing an interruption handling program; latching and holding information output onto the internal bus in respose to a match between an address output onto the internal bus and the target address set to the register; and reading the latched and held information.

Preferably, the method further comprises the step of, in response to a match between an address output onto the internal bus and the target address set to the register, stopping the execution of the user program by generating an interruption signal.

In accordance with another aspect of the present invention, there is provided a method of getting information output onto an internal bus to facilitate detection of a malfunction position in a storage element stored in a microcomputer during execution of a user program, the method comprising the steps of: setting a maximum count value to a down counter after the expiration of a predetermined time interval after starting the execution of the user program and then causing the down counter to start decreasing its count value one by one at every clock cycle at the same time that the maximum count value is set to the down counter, the maximum count value corresponding to a number of clock cycles that elapses during execution of a predetermined part of the user program that is to be checked in order to identify a malfunction position in the built-in storage element; latching and holding information output onto the internal bus once the down counter underflows; reading the latched and held information to compare the information with its desired value and then determine whether the built-in storage element malfunctioned within a time period during which the down counter was decreasing its count value; restarting the execution of the user program while delaying the timing of setting the maximum count value to the down counter during the execution of the user program until identifying a part of the user program in which the built-in storage element malfunctions; and reducing the current maximum count value set to the down counter by half in order to narrow the identified part of the user program in which the built-in storage element malfunctions down to a first or second half of the identified part, and further determining whether the built-in storage element malfunctions in the first or second half.

In accordance with a further aspect of the present invention, there is provided a device for getting information output onto an internal bus to facilitate detection of a malfunction position in a storage element stored in a microcomputer during execution of a user program, the device comprising: a down counter to which a maximum count value is set, the maximum count value corresponding to a number of clock cycles that elapses during execution of a part of the user program that is to be checked in order to identify a malfunction position in the built-in storage element, and the down counter starting at the same time that the maximum count value is set, decreasing its count value one by one at every clock cycle, and generating an underflow signal when it underflows; and a latch unit for latching and holding information output onto the internal bus in response to the underflow signal from the down counter.

In accordance with a preferred embodiment of the present invention, the latch unit includes a plurality of latches each for latching each of a plurality of units of information output onto the internal bus according to a plurality of bus accesses.

Further objects and advantages of the present invention will be apparent from the following description of the preferred embodiments of the invention as illustrated in the accompanying drawings.

BRIEF DESCRIPTION OF THE DRAWINGS

FIG. 2 is a block diagram showing the structure of the internal bus information getting device according to the first embodiment of the present invention;

DETAILED DESCRIPTION OF THE PREFERRED EMBODIMENTS

Embodiment 1

Figure 1:
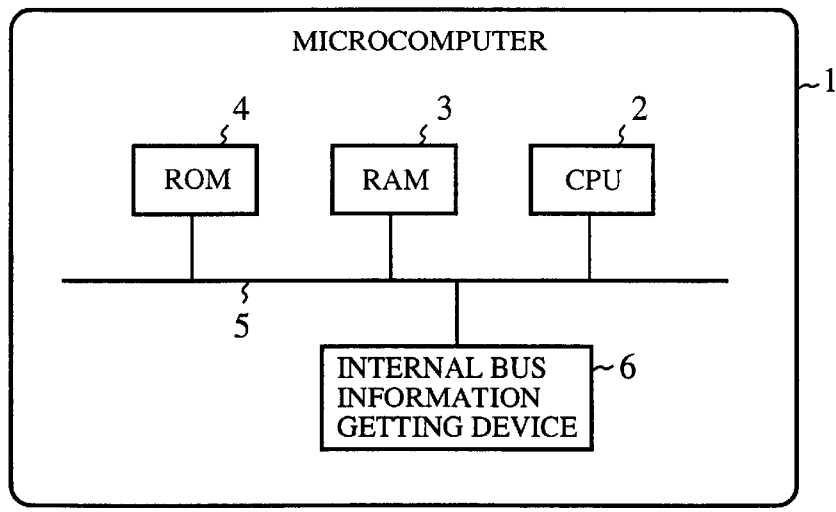
FIG. 1 is a block diagram showing the structure of a microcomputer provided with an internal bus information getting device according to a first embodiment of the present invention.

Referring now to FIG. 1, it illustrates the structure of a microcomputer provided with an internal bus information getting device according to a first embodiment of the present invention. In the figure, reference numeral 1 denotes the microcomputer, numeral 2 denotes a CPU, numeral 3 denotes a RAM, numeral 4 denotes a ROM, numeral 5 denotes an internal bus for connecting the CPU 2, the RAM 3, and the ROM 4 with one another, and numeral 6 denotes the internal bus information getting device connected to the internal bus 5, for latching and holding information output onto the internal bus 5 when a preset trigger condition is satisfied.

Referring next to FIG. 2, it illustrates the structure of the internal bus information getting device according to the first embodiment of the present invention. In the figure, reference numeral 10 denotes an internal address bus, numeral 11 denotes an internal data bus, numeral 12 denotes a trigger address setting register for setting a target address (from here on referred to as trigger address) specifying a memory access that is expected to cause a built-in storage element, such as a built-in memory like the RAM 3, or the ROM 4, to malfunction, numeral 13 denotes an address comparator for comparing an address output onto the internal address bus 10 with the trigger address preset by the trigger address setting register 12 and for furnishing an address match signal when they match each other, numeral 14 denotes a bus access start signal source for generating a bus access start signal, and numeral 15 denotes a bus access end signal source for generating a bus access end signal. The bus access start and end signals can be read and write signals furnished by the CPU. In this case, the internal bus information getting device can recognize the bus access start and end times by detecting rising or falling edges of those signals. As an alternative, the bus access start and end signals can be other pulses indicating the bus access start and end times, respectively.

Furthermore, reference numeral 16 denotes an access property information latch enabling unit for generating an enable signal for enabling a latch of access property information in response to the address match signal from the address comparator 13 and the bus access start signal, numeral 17 denotes an access property information latching unit for latching the access property information in response to the enable signal from the access property information latch enabling unit 16, and numeral 18 denotes an access property information source for generating the access property information. The access property information can be provided by the read and write signals furnished by the CPU, a control signal furnished by a bus controller (not shown), and so on. In accordance with the present invention, the internal bus can include a signal line extending from the access property information source 18, as well as the internal address and data buses.

In addition, reference numeral 19 denotes a data bus latch enabling unit for generating an enable signal for enabling a latch of information output on the internal data bus 11 in response to the address match signal from the address comparator 13 and the bus access end signal, and numeral 20 denotes a data bus latching unit for latching the information output on the internal data bus 11 in response to the enable signal from the data bus latch enabling unit 19.

Figure 3:
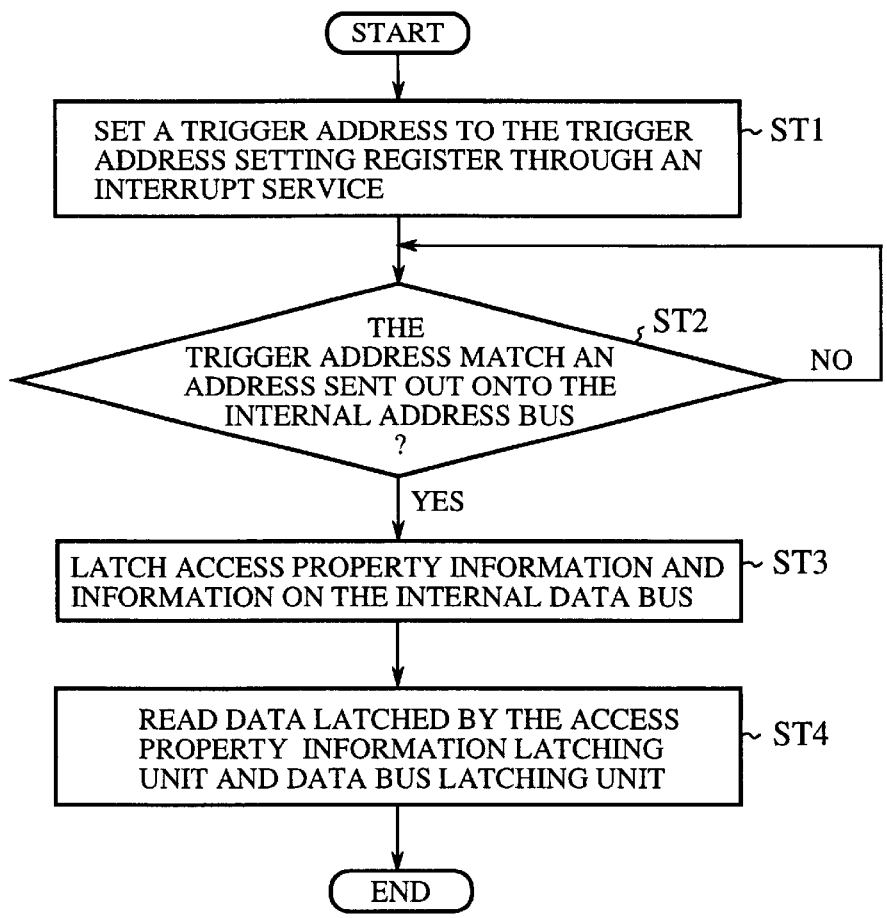
FIG. 3 is a flow diagram showing the operation of the internal bus information getting device according to the first embodiment of the present invention.

Referring next to FIG. 3, it illustrates a flow chart showing the operation of the internal bus information getting device according to the first embodiment of the present invention. First, the internal bus information getting device, in step ST1, sets a trigger address specifying a memory access that is expected to cause a built-in storage element to malfunction to the trigger address setting register 12. Setting the trigger address to the trigger address setting register 12 is done by the execution of an address setting program that causes an operand access by the CPU. It should be noted that a change in the program structure caused by the addition of the address setting program can result in a possibility that the malfunction is not duplicated. In other words, there is a possibility that the duplication of the malfunction is not ensured because an even a small change in the user program causes a change in addresses showing locations where instructions are allocated and hence there causes a difference in the state of the internal bus between the case of a malfunction position and the case where the address setting program is added to set the trigger address. Not to change the state of the internal bus, it is desirable that the setting of the trigger address is done using an interruption handling program that is stored in a storage area different from that in which the user program is stored.

When the trigger address is set, the address comparator 13, in step ST2, compares the trigger address with an address output onto the internal address bus 10 at every clock cycle, and then generates an address match signal when they match each other. When the access property information latch enabling unit 16 detects a bus access to the address while the address match signal is being output, it generates an enable signal to enable the access property information latching unit 17 to latch the access property information. In response to the enable signal, the access property information latching unit 17, in step ST3, latches the access property information. The access property information can include read/write identification information on the executed memory access, instruction fetch/operand access identification information, and so on.

When the data bus latch enabling unit 19 detects the completion of the bus access to the address equal to the trigger address while the address match signal is being output, it generates an enable signal to enable the data bus latching unit 20 to latch information on the internal data bus 11. In response to the enable signal, the data bus latching unit 20, in step ST3, latches information on the internal data bus 11. In general, data associated with any bus access is output on the internal data bus 11 when the bus access is completed.

The CPU 2 then reads the data latched by the access property information latching unit 17 and the data bus latching unit 20 out of them in step ST4. The CPU 2 can determine whether or not the access to the target address preset to the trigger address setting register 12 was made properly by reading the data latched by the data bus latching unit 20. Further, when the access was not made properly, the CPU 2 can precisely identify which bit in the latched data has an error. In addition, the CPU 2 can recognize the type of the memory access or the like by reading the data latched by the access property information latching unit 17.

It is desirable to provide a function of generating an interruption signal when the data bus latch enabling unit 19 generates an enable signal. The generation of the interruption signal makes it possible to stop the execution of the user program when a memory access that is expected to cause a built-in storage element to malfunction is made, and to store information showing the internal state of the microcomputer when the malfunction occurs.

As previously mentioned, in accordance with the first embodiment of the present invention, the internal bus information getting device can latch information output onto the internal bus and read the latched information when a generated address specifying a memory access matches a preset trigger address, which is expected to cause a built-in storage element to malfunction. It is thus possible for any device outside the microcomputer to get an in-depth perspective on the latched internal bus information. The first embodiment thus offers the advantage of being able to carry out an analysis of the reason why the built-in storage element, such as a built-in memory, malfunctions with efficiency.

In addition, since the internal bus information getting device can set a trigger address that is expected to cause a built-in storage element to malfunction to the trigger address setting register using an interruption handling program, it makes it possible to keep the state of the internal bus unchanged as compared with the case where a specific address setting program is executed to set the trigger address and then the built-in storage element malfunctions as expected. The first embodiment of the present invention thus offers the advantage of being able to replicate the malfunction of a built-in storage element and to speedily perform an analysis of the malfunction of the built-in storage element with reliability.

Furthermore, when the internal bus information getting device detects a match between the trigger address, which is expected to cause a built-in storage element to malfunction, and an address output onto the address bus, the internal bus information getting device can generate an enable signal to latch information on the data bus and store the latched information showing the internal state of the microcomputer when the malfunction occurs by generating an interruption signal and then stopping the execution of the user program. Accordingly, the first embodiment of the present invention offers the advantage of being able to perform an analysis of the malfunction with more efficiency.

Embodiment 2

Figure 4:
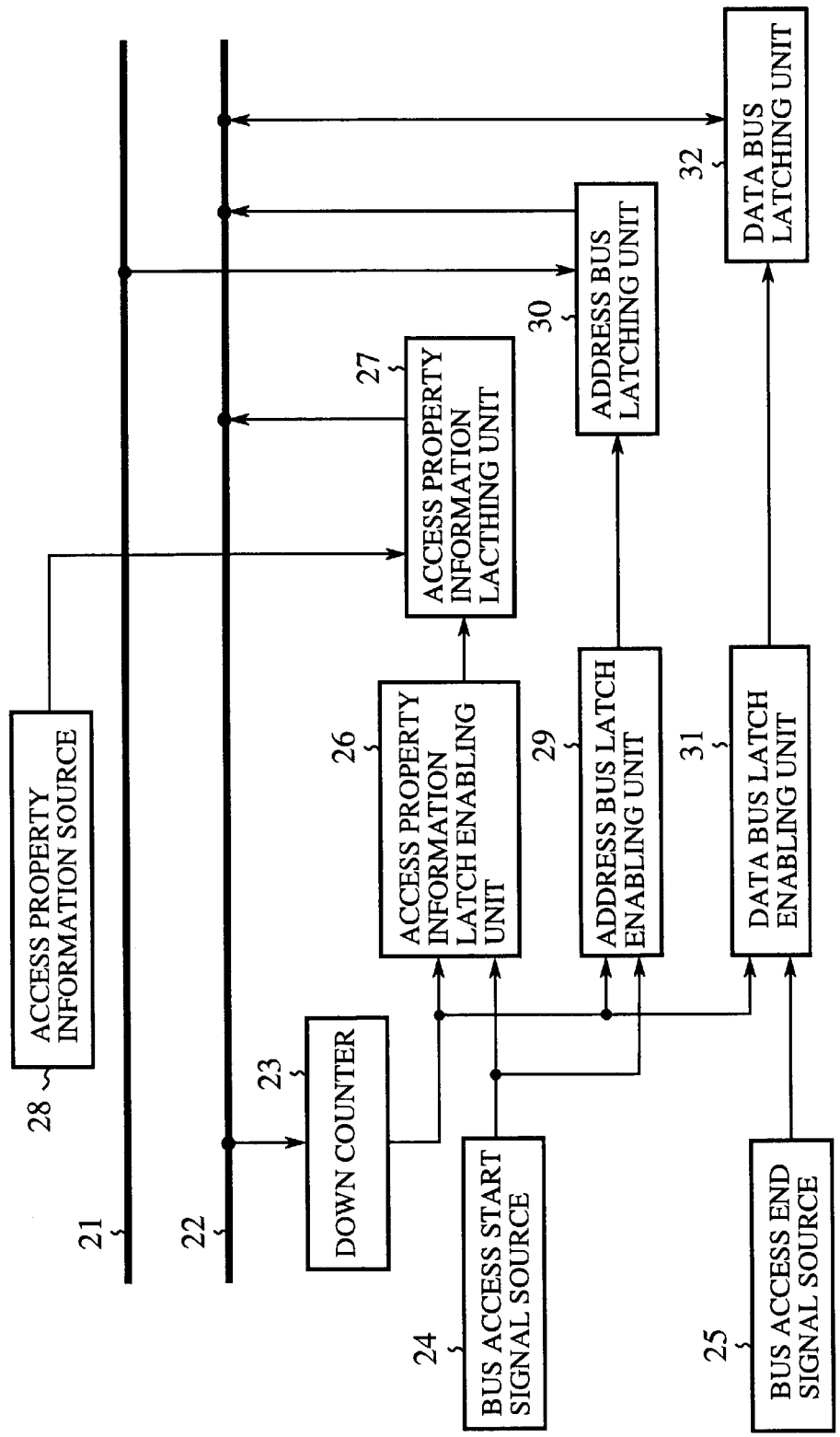
FIG. 4 is a block diagram showing the structure of an internal bus information getting device according to a second embodiment of the present invention.

Referring next to FIG. 4, it illustrates the structure of an internal bus information getting device according to a second embodiment of the present invention. In the figure, reference numeral 21 denotes an internal address bus, numeral 22 denotes an internal data bus, numeral 23 denotes a down counter that starts at the same time that its maximum count value is set thereto, decreases its count value one by one at every clock cycle, and generates an underflow signal when it. underflows, numeral 24 denotes a bus access start signal source for generating a bus access start signal, numeral 25 denotes a bus access end signal source for generating a bus access end signal, numeral 26 denotes an access property information latch enabling unit: for generating an enable signal to enable a latch of access property information in response to the underflow signal from the down counter 23 and the bus access start signal, numeral 27 denotes an access property information latching unit for latching the access property information in response to the enable signal from the access property information latch enabling unit 26, numeral 28 denotes an access property information source for generating the access property information, numeral 29 denotes an address bus latch enabling unit for generating an enable signal to enable latch of information output onto the internal address bus 21 in response to the underflow signal from the down counter 23 and the bus access start signal, numeral 30 denotes an address bus latching unit for latching the information output onto the internal address bus 21 in response to the enable signal from the address bus latch enabling unit 29, numeral 31 denotes a data bus latch enabling unit for generating an enable signal to enable the latching of information output onto the internal data bus 22 in response to the underflow signal from the down counter 23 and the bus access end signal, and numeral 32 denotes a data bus latching unit for latching the information output onto the internal data bus 22 in response to the enable signal from the data bus latch enabling unit 31. The relationship between the internal bus information getting device according to the second embodiment of the present invention and the other components disposed within the microcomputer is the same as that according to the aforementioned first embodiment. Further, the bus access start and end signals, and the access property information are the same as those mentioned above in the first embodiment. Therefore, the description of the relationship between the internal bus information getting device and the other components disposed within the microcomputer, the bus access start and end signals, and the access property information will be omitted hereinafter.

Figure 5:
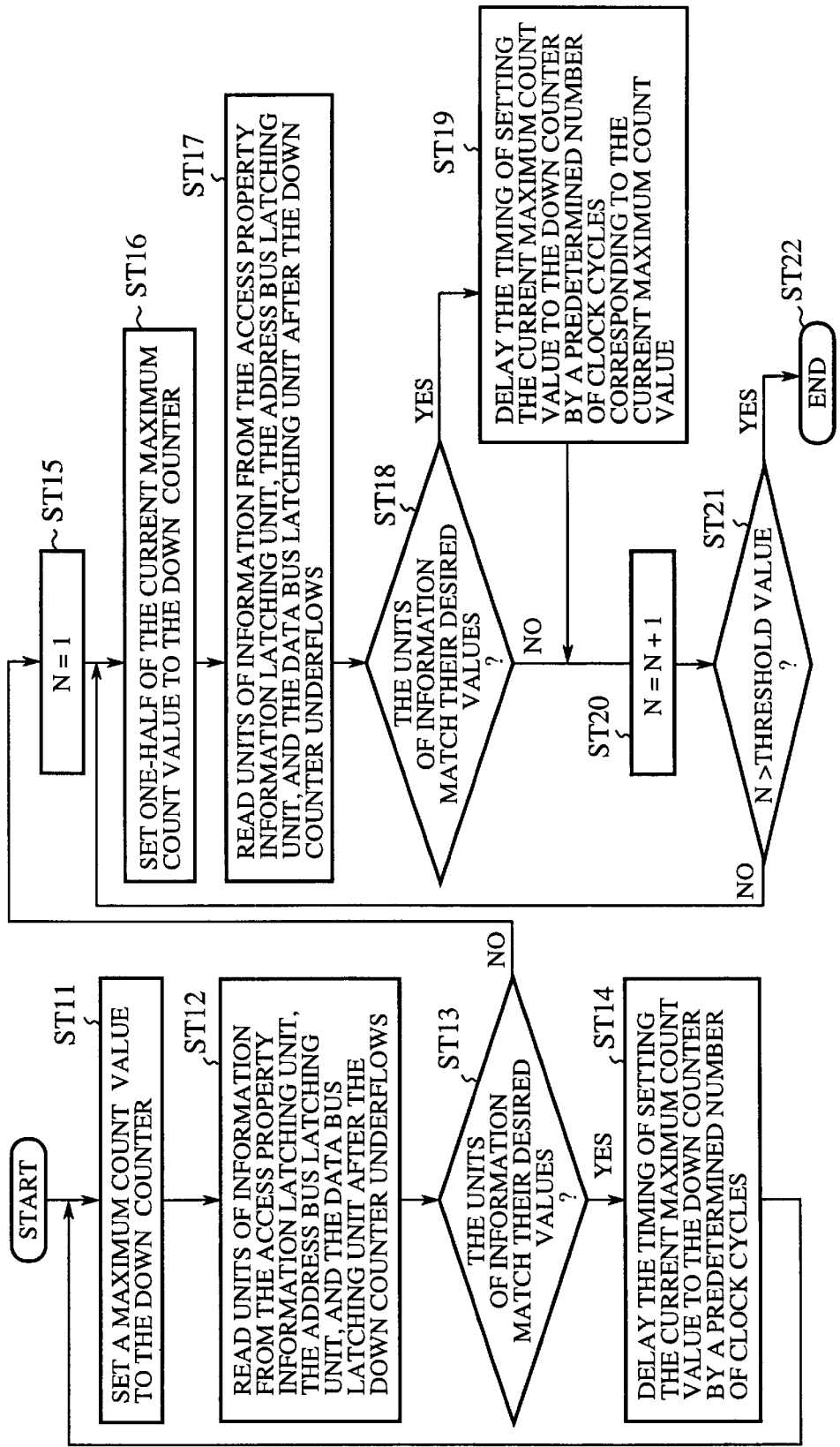
FIG. 5 is a flow diagram showing the operation of the internal bus information getting device according to the second embodiment of the present invention.

Referring next to FIG. 5, it illustrates a flow showing the operation of the internal bus information getting device according to the second embodiment of the present invention. After a number of clock cycles has elapsed after starting the execution of a user program, that is, after the expiration of a predetermined time interval after starting the execution of a user program, the internal bus information getting device, in step ST11, sets a maximum count value to the down counter 23. For example, when the down counter is a 32-bit counter, the internal bus information getting device sets FFFFFFFF in hex to the down counter 23. At the same time that the maximum count value is written into the down counter 23, the down counter 23 starts decreasing its count value. After (FFFFFFFF+1) (in hex) clock cycles have elapsed, the down counter 23, underflows and then generates an underflow signal. In other words, the down counter. 23 decreases its count value one by one at every clock cycle. In order to check the operation of a built-in storage element, the internal bus information getting device has to write the maximum count value into the down counter 23 before the execution of the head portion of a part of a user program in which it is expected that the built-in storage element malfunctions.

When the underflow signal is furnished by the down counter 23, the address bus latching unit 30 latches information output on the internal address bus 21 in response to the first bus access start signal. Further, the access property information latching unit 27 latches the access property information in response to the first bus access start signal. The data bus latching unit 32 then latches information on the internal data bus 22 in response to the corresponding bus access end signal associated with the bus access. After that, the CPU, in step ST12, reads the plurality of units of information latched by the address bus latching unit 30, the access property information latching unit 27, and the data bus latching unit 32 from those latching units. The CPU then, in step ST13, determines whether the built-in storage element has malfunctioned by comparing the plurality of units of information with their respective desired values. After the built-in memory has malfunctioned, the user program will work in a way different to the way in which it works properly. Therefore, the CPU can determine whether the built-in memory had malfunctioned during the interval between the instant when the maximum count value was set to the down counter 23 and the instant when the down counter 23 overflowed by comparing the plurality of units of latched information with desired values, which can be obtained when the built-in memory works properly, respectively. When there is a chip that works properly, the desired values can be obtained by latching the plurality of units of information furnished by the chip. When an operating condition for causing any chip to work properly can be found, the desired values can be alternatively obtained by latching the plurality of units of information furnished by a chip that works under the operating condition. When no operating condition for causing any chip to work properly is found, the desired values can be alternatively obtained using a logical simulation.

When the plurality of units of information match their respective desired values, in performing step ST13, it can be determined that the built-in storage element did not malfunction within a time period during which the down counter 23 was decreasing from the previously-set maximum count value to zero, the time period corresponding to a part of the user program in which it was expected that the built-in storage element malfunctions. The internal bus information getting device then, in step ST14, delays the timing of writing the current maximum count value into the down counter 23 with respect to the previous timing by a predetermined number of clock cycles in order to vary the next part of the user program to be checked, which corresponds to the next time period during which the down counter 23 will decrease its count value, and then restarts executing the user program. In general, in order to set the next part of the user program to be checked to a part of the user program immediately behind the already-checked previous part of the user program, it is desirable that the internal bus information getting device delays the timing of writing the current maximum count value into the down counter 23 with respect to the previous timing of writing the current maximum count value into the down counter 23 by a number of clock cycles corresponding to the maximum count value programmable to the down counter 23. The internal bus information getting device then returns to step ST11 in order to determine whether the built-in memory malfunctions during the next period of time in the same manner, as mentioned above.

When any one of the plurality of units of information does not match its desired value, in performing step ST13, it can be determined that the built-in memory malfunctioned within the previous time period during which the down counter 23 was decreasing from the previously-set maximum count value to zero. In this manner, the part of the user program in which the built-in storage element malfunctions is identified. In order to narrow the already-identified part of the user program in which the built-in storage element malfunctions down to a first or second half of the identified part, the internal bus information getting device then, in step ST15, sets a variable N, which is an indicator used for narrowing the identified part, to 1.

The internal bus information getting device identifies the part of the user program in which the built-in storage element malfunctions, and in step ST16, sets one-half of the current maximum count value to the down counter 23 after the expiration of the predetermined time interval after restarting the execution of the user program. If N=1, the internal bus information getting device sets one-half of the current maximum count value to the down counter 23 after the expiration of the same predetermined time interval as that needed to trigger the previous setting of the maximum count value into the down counter to identity the part of the user program in which the built-in storage element malfunctions, after restarting the execution of the user program. In this case, the new maximum count value set to the down counter is one-half of the previous maximum count value, i.e., 7FFFFFFF in hex.

When the predetermined number of clock cycles elapses and the down count 23 then furnishes an underflow signal after the new maximum count value has been set to the down counter 23, the internal bus information getting device, in step ST17, latches information output on the internal address bus 21, information on the internal data bus 22 and the access property information, in the same manner that it does in step ST12. After that, the CPU reads the plurality of units of information latched by the address bus latching units 30, the access property information latching unit 27, and the data bus latching unit 32, out of them. The CPU then, in step ST18, determines whether the built-in storage element has malfunctioned by comparing the plurality of units of information with their respective desired values.

When the plurality of units of information match their respective desired values, in step ST18, it can be determined that the built-in storage element did not malfunction within the previous time period during which the down counter 23 was decreasing its count value from the previously-set maximum count value to zero, the time period corresponding to the previously-checked, narrowed part of the user program. Thus it can be determined that the malfunction must occur during the execution of the second half of the previously-identified part of the user program, the second half corresponding to a certain time period between the instant when the next clock is applied immediately after the completion of the clock cycle in which the down counter underflowed and the instant when the same number of clock cycles corresponding to the previously-set maximum count value elapses. The internal bus information getting device determines that the malfunction must occur during the execution of the second half of the previously-identified part of the user program, and in step ST19, delays the timing of writing the current maximum count value into the down counter 23 after restarting the execution of the user program, with respect to the previous timing of writing the current maximum count value into the down counter 23, by a number of clock cycles corresponding to the current maximum count value.

When anyone of the plurality of units of information does not match its desired value, in performing step ST18, it can be determined that the built-in storage element malfunctioned within the previous time period during which the down counter 23 was decreasing its count value from the previously-set maximum count value to zero. In this manner, it is determined the built-in storage element malfunctions during the execution of the narrowed part of the user program corresponding to the previous time period between the instant when the previous maximum count value was set to the down counter and the instant when the down counter 23 underflowed. When it is determined that the built-in storage element has malfunctioned during the execution of the first half of the previously-identified part of the user program, the internal bus information getting device does not change the timing of writing the current maximum count value into the down counter 23.

The internal bus information getting device then, in step ST20, increments the variable N, which is an indicator used for narrowing the already-identified part of the user program in which the malfunction occurs, by 1. The internal bus information getting device further, in step ST21, determines whether the variable N exceeds a given threshold value. For example, the threshold value can be the number of bits of the down counter 23 or a value close to the number of bits.

When the internal bus information getting device determines that the variable N exceeds the given threshold value in performing step ST21, it, in step ST22, stops the process. In contrast, when the internal bus information getting device determines that the variable N does not exceed the given threshold value, it restarts the execution of the user program and then returns to step ST16 in which it further reduces the current maximum count value to half and then identifies in which one of the first and second halves of the previously-identified part of the user program the built-in storage element malfunctions.

As previously mentioned, in accordance with the second embodiment, the internal bus information getting device comprises the down counter 23 to which an arbitrary count value equal to or less than its maximum count value is programmable, for starting decreasing its count value at the same time that the arbitrary count value is set thereto, and the latches 27, 30, and 32, responsive to a signal indicating that the down counter finishes counting down, each for latching information on the internal bus. The internal bus information getting device can check whether the built-in storage element malfunctions during the execution of arbitrary part of the user program. Accordingly, the second embodiment offers the advantage of being able to identify part of the user program in which the built-in storage element malfunctions with efficiency.

Furthermore, because the internal bus information getting device can further narrow an already-identified part of the user program in which it has determined that the built-in storage element malfunctions down to a first or second half of the identified part, it can identify part of the user program in which the built-in memory malfunctions more finely with a limited number of repetitions.

In a variant of the first and second embodiments mentioned above, there are provided a plurality of access property information latching units, a plurality of address bus latching units and a plurality of data bus latching units. By means of those latching units, the internal bus information getting device can get and hold a plurality of units of information associated with a plurality of bus accesses made immediately before and after a trigger is generated. The variant thus offers the advantage of being able to obtain more access information at one time.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of getting information output onto an internal bus to facilitate detection of a malfunction position in a built-in storage element stored in a microcomputer during execution of a user program, said method comprising the steps of:

setting a target address specifying a memory access that is expected to cause the built-in storage element to malfunction to a register, by executing an interruption handling program;

latching and holding access property information and data information output onto the internal bus in response to a match between an address output onto the internal bus and the target address set to said register;

reading the latched and held access property information and data information; and determining whether access to the target address was successful based upon the read access property information and data information to detect the malfunction position in the built-in storage element.

2. The method according to claim 1, further comprising the step of, in response to a match between an address output onto said internal bus and the target address set to said register, stopping the execution of the user program by generating an interruption signal.

3. A method of getting information output onto an internal bus to facilitate detection of a malfunction position in a built-in storage element stored in a microcomputer during execution of a user program, said method comprising the steps of:

setting a maximum count value to a down counter after the expiration of a predetermined time interval after starting the execution of the user program and then causing said down counter to start decreasing its count value one by one at every clock cycle at the same time that the maximum count value is set to said down counter, the maximum count value corresponding to a number of clock cycles that elapses during execution of a predetermined part of the user program that is to be checked in order to identify a malfunction position in the built-in storage element;

latching and holding information output onto the internal bus once said down counter underflows;

reading the latched and held information to compare the information with its desired value and then determine whether the built-in storage element malfunctioned within a time period during which said down counter was decreasing its count value;

restarting the execution of the user program while delaying the timing of setting the maximum count value to said down counter during the execution of the user program until identifying a part of the user program in which said built-in storage element malfunctions; and reducing the current maximum count value set to said down counter by half in order to narrow the identified part of the user program in which said built-in storage element malfunctions down to a first or second half of the identified part, and further determining whether said built-in storage element malfunctions in the first or second half.

4. A device for getting information output onto an internal bus to facilitate detection of a malfunction position in a built-in storage element stored in a microcomputer during execution of a user program, said device comprising:

a down counter to which a maximum count value is set, the maximum count value corresponding to a number of clock cycles that elapses during execution of a part of the user program that is to be checked in order to identify a malfunction position in the built-in storage element, and said down counter starting at the same time that the maximum count value is set, decreasing its count value one by one at every clock cycle, and generating an underflow signal when it underflows;

a latch means for latching and holding address information, data information and access property information output onto said internal bus in response to the underflow signal from said down counter; and reading means for reading the latched and held address information, data information and access property information and for determining whether the built-in storage element malfunctioned within a time period in which said down counter decreased its count value.

5. The device according to claim 4, wherein said latch means includes a plurality of latches each for latching each of a plurality of units of information output onto said internal bus according to a plurality of bus accesses.

* * * * *